United States Patent
Huang et al.

(10) Patent No.: US 9,317,535 B2
(45) Date of Patent: Apr. 19, 2016

(54) CUMULATIVE IMAGE RECOGNITION METHOD AND APPLICATION PROGRAM FOR THE SAME

(71) Applicant: VISCOVERY PTE. LTD., Singapore (SG)

(72) Inventors: Chun-Chieh Huang, Singapore (SG); Hsin-Yu Lin, Singapore (SG)

(73) Assignee: VISCOVERY PTE. LTD., Singapore (SG)

( * ) Notice: Subject to any disclaimer, the term of this patent is extended or adjusted under 35 U.S.C. 154(b) by 93 days.

(21) Appl. No.: 14/107,445

(22) Filed: Dec. 16, 2013

(65) Prior Publication Data

US 2015/0170003 A1   Jun. 18, 2015

(51) Int. Cl.
  G06K 9/00  (2006.01)
  G06F 17/30  (2006.01)
  G06K 9/22  (2006.01)
  G06K 9/62  (2006.01)

(52) U.S. Cl.
  CPC ...... *G06F 17/30277* (2013.01); *G06K 9/00671* (2013.01); *G06K 9/228* (2013.01); *G06K 9/6288* (2013.01)

(58) Field of Classification Search
  CPC ... G06K 9/68; G06K 9/6202; G06K 2209/27; G06K 9/00979; G06F 17/30247; G06F 17/30277
  USPC .......... 382/181, 187, 218, 209, 217; 704/200, 704/231, 251, 236, 239, 254, 270, 275, 252, 704/241, 238
  See application file for complete search history.

(56) References Cited

U.S. PATENT DOCUMENTS

| | | | |
|---|---|---|---|
| 7,715,594 B2 * | 5/2010 | Ko et al. | 382/117 |
| 8,411,912 B2 * | 4/2013 | Bigioi et al. | 382/118 |
| 8,873,813 B2 * | 10/2014 | Tadayon et al. | 382/118 |
| 8,953,846 B2 * | 2/2015 | Wu et al. | 382/105 |
| 2007/0009159 A1 * | 1/2007 | Fan | 382/209 |
| 2010/0046842 A1 * | 2/2010 | Conwell | 382/218 |
| 2012/0230555 A1 * | 9/2012 | Miura et al. | 382/124 |

* cited by examiner

*Primary Examiner* — Sheela C Chawan
(74) *Attorney, Agent, or Firm* — Muncy, Geissler, Olds & Lowe, P.C.

(57) ABSTRACT

A cumulative image recognition method performs a matching analysis on frame and matching data in a mobile device when the mobile device focuses on a recognition target and captures frame of the image of the recognition target. The method obtains the feature value of each matching data according to the matching result, and determines if one of the matching data has an optimal result matching the recognition target according to several entries of feature values. If no optimal result, then the method respectively sums up the feature value of each matching data into a summing feature value and determines if the plurality of the matching data has a candidate result similar to the recognition target according to several entries of the summing feature values. If no candidate result, the mobile device captures the next frame on the recognition target, and performs next matching analysis on the next frame.

10 Claims, 5 Drawing Sheets

CUMULATIVE IMAGE RECOGNITION METHOD AND APPLICATION PROGRAM FOR THE SAME

BACKGROUND OF THE INVENTION

1. Field of the Invention

The present invention relates to an image recognition method, in particular further relates to an image recognition method for providing an optimal result or a candidate result of recognition to users.

2. Description of Related Art

For the convenience of users to check related data of a physical product, technologies of the image recognition become popular in recent years. The image recognition takes a photo on a physical product, and determines what the physical product is after analyzing and recognizing the photo, and retrieves the related data of the physical product offering to users for reference.

Generally speaking, the current image recognition technologies are categorized into online recognition and offline recognition. The offline recognition integrates the required data by the recognition in an offline device, such as a personal computer or a mobile device, and the offline device executes the recognition operation. The online recognition transfers the photo of the physical product captured by users to an online server and the server performs the recognition operation.

When using an offline device for performing offline recognition, users are allowed to obtaining recognition result the fastest because the operation is not involved with network data transfer. Nonetheless, because the offline device has limited saving space, the offered matching data quantity is limited as a result. Though the offline recognition provides faster recognition, but the accuracy rates are low.

Alternatively, when using a server for performing online recognition, the required recognition time is much longer than the offline recognition because the operations involves with the network data transfer, for example uploading photos taken by users, and transferring recognition results to the devices of the users via networks after the server completes recognition. Nonetheless, the saving space of servers are large, and are capable of saving large amount of the matching data and the accuracy rates accordingly are much higher than the offline recognition.

As a result, it is the focus of the inventor to develop a technology which provides the advantages of offline recognition and online recognition.

SUMMARY OF THE INVENTION

The objective of the present invention is to provide a cumulative image recognition method and application for implementing the method, which is used when an optimal result is not generated by recognizing one frame, several frames are captured for performing multiple recognition several times. The feature values generated from several recognition are summed up to obtain a candidate result according to the summing feature value, which avoids the issue occurs when the recognition of single one frame with matching data fails, the user cannot obtain the recognition result.

In order to obtain the above objective, a mobile device of the present invention focuses on a recognition target, the mobile device obtains frame of the image of a recognition target, and performs a matching analysis between the frame and a plurality of the matching data in the mobile device. Next, obtain the feature value of each matching data according to the matching result and determine if the plurality of the matching data has an optimal result matching the recognition target according to several feature values. If no optimal result, sum up the feature value of each matching data respectively into a summing feature value, and determine if the plurality of the matching data has a candidate result similar with the recognition target according to several summing feature values. If no candidate result, the mobile device captures next frame of the recognition target, and perform next matching analysis on next frame.

A conventional image recognition method performs a matching analysis on single one photo or frame of the recognition target with a plurality of the matching data for obtaining the similar features between the frame and the matching data. Then determine if the recognition target matches the matching data according to the quantity of the similar features. Compare with the prior arts, the present invention provide an advantage is that after perform a matching analysis between a frame and a plurality of the matching data, respectively sum up the feature value of the plurality of the matching data if fail to recognize an optimal result. After recognizing a plurality of frames, if the summing feature value of any matching data is higher than the threshold value, consider the matching data as a candidate result similar to the recognition target.

The recognition method of the present invention is useful in avoiding the issue occur when perform a one time recognition on single one frame of the recognition target, the recognition on the frames of the same object taken from different capture angles and lighting may fail or succeed. Further, if the matching data is highly similar but different from the recognition target, the matching data is considered as a candidate result according to the present invention for user's reference such that users can obtain a recognition result.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
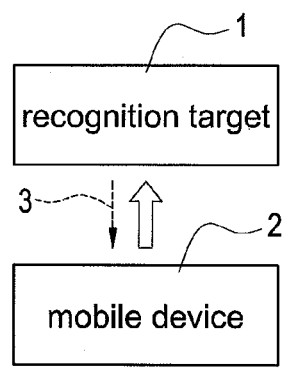
FIG. 1 is an architecture schematic diagram of the first preferred embodiment according to the present invention.
Figure 2:
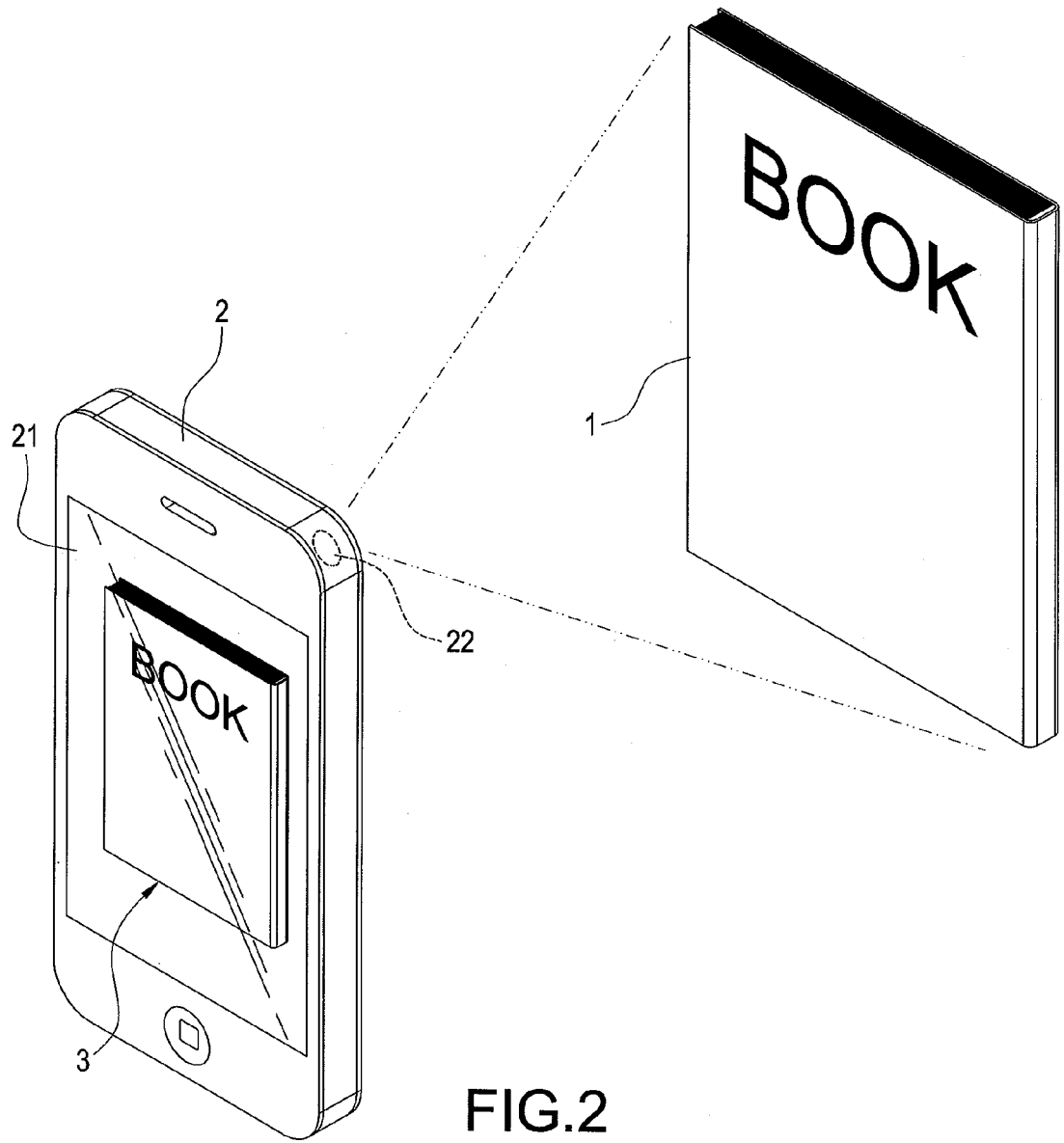
FIG. 2 is a frame capturing schematic diagram of the first preferred embodiment according to the present invention.

FIG. 1 and FIG. 2 are an architecture schematic diagram and a frame capturing schematic diagram of the first preferred embodiment according to the present invention. The present invention discloses a cumulative image recognition method (referred as the recognition method in the following). The recognition method mainly uses in a mobile device 2 carried by a user. The mobile device 2 can be a smart phone, a tablet or a notebook computer etc. In FIG. 2, a mobile phone is used as an example but is not limited thereto. Via the mobile device 2, the user performs recognition on a physical recognition target 1. Upon the recognition succeeds, the mobile device 2 obtains a recognition result about the recognition target 1. The recognition result comprises texts, pictures and film data of the recognition target 1, offered for user's reference about the recognition target 1. Thus, the user can proceed to actions such as purchase, selling, renting the recognition target 1.

In order to implement the recognition method, a user has to operate the mobile device 2 for obtaining the frame of the image 3 of the recognition target 1 via an image capturing unit 22 on the mobile device 2. The image capturing unit 22 obtains the frame 3 under a camera capturing model. Also, it should be noted that the content of the frame 3 has to include the recognition target 1 in order to perform recognition on the recognition target 1.

Figure 3:
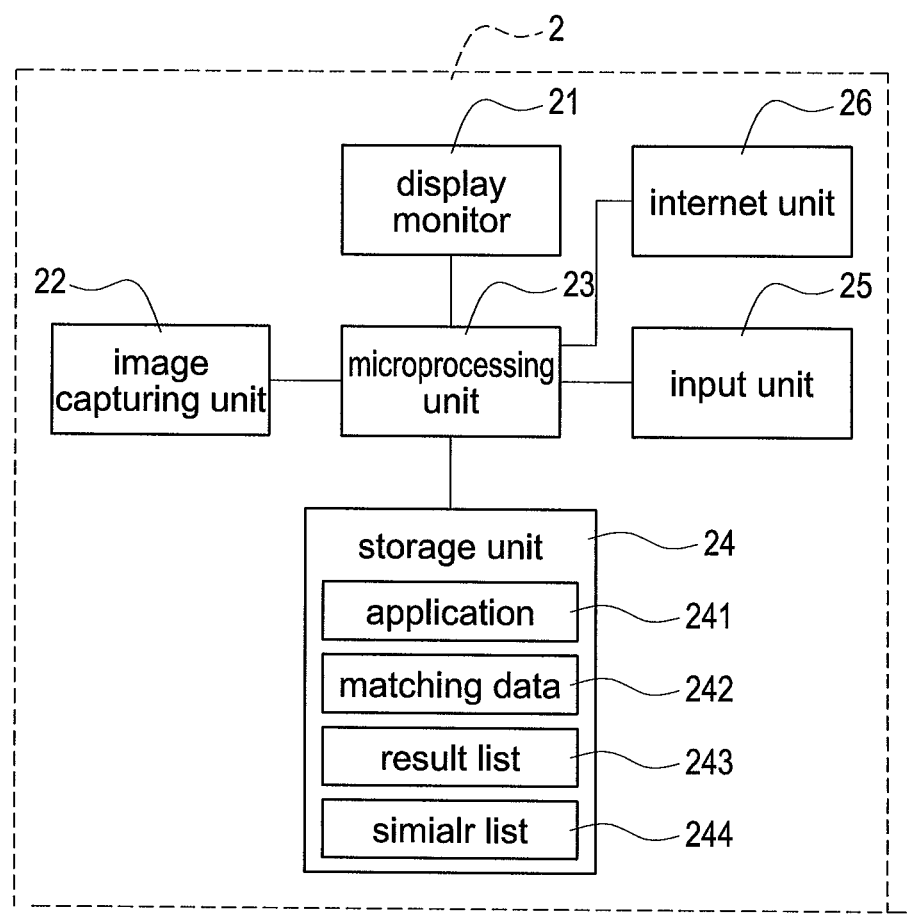
FIG. 3 is a block diagram of a mobile device of the first preferred embodiment according to the present invention.

The mobile device 2 performs the image recognition operation on the frame 3 via the application installed in the mobile device 2 (as the application 241 shown in FIG. 3). Lastly, the recognition result is displayed on the display monitor 21 for user's searching reference. Thus, the user is allowed to obtain about related information of the recognition target 1 from the recognition results, such as pictures, names, places of origin, publishers, distributors, prices and purchase methods etc. The application 241 has executable programming codes written in and applicable to the mobile device 2, and after the mobile device 2 is installed with the application 241 and the application 241 is executed, the recognition method of the present invention is executed via the programming codes of the application 241.

FIG. 3 is a block diagram of a mobile device of the first preferred embodiment according to the present invention. As shown in FIG. 3, the mobile device 2 comprises the display monitor 1, the image capturing unit 22, a microprocessor unit 23, a storage unit 24, an input unit 25 and an internet unit 26. The microprocessor unit 23 is electrically coupled to the display monitor 1, the image capturing unit 22, the storage unit 24, the input unit 25 and the internet unit 26 for controlling the units 21, 22, 24, 25, 26, and transferring data and instructions among the units 21, 22, 24, 25, 26.

The mobile device 2 obtains the frame of the image 3 of the recognition target 1 via the image capturing unit 22, and performs the image recognition operation on the frame 3. Also, after the recognition succeeds, an optimal result or a candidate result obtained form the recognition is displayed on the display monitor 21 for user's searching reference.

The application 241 is saved in the storage unit 24. The mobile device 1 controls the image capturing unit 22 to obtain the frame 3, and performs image recognition on the frame 3 via executing the application 241. Additionally, a plurality of the matching data 242 is also saved in the storage unit 24. When the application 241 performs the image recognition, the application 241 performs a matching analysis between the frame 3 and the plurality of the matching data 242 for determining if the plurality of the matching data 242 has the matching data 242 matching the recognition target 1. Further in details, the application 241 performs an image analysis on the frame 3 and the matching data 242, and respectively acquiring one or several featuring points each similar between the matching data 242 and the frame 3. Thus, the application 241 determines if each matching data matches the recognition target 1 in the frame 3 according to similar feature quantity (i.e. the feature value) of each matching data 242.

The input unit 25 is for example a button, a track ball, a mouse or a body sensing module offered to the user for operating the mobile device 1. Additionally, the input unit 25 is integrated with the display monitor 21, i.e. the display monitor 21 is a display monitor providing touch control, but is not limited thereto.

The internet unit 26 is used for facilitating the mobile device 1 to connect to networks, for example wide area network or area network etc. Thus, the user obtains recognition result of the recognition target 1 on the mobile device 1, and connects to the Internet via the internet unit 26, for executing following operations such as purchasing, selling, renting the recognition target 1, or further checking the detailed data of the recognition target 1 according to the recognition result.

Figure 4:
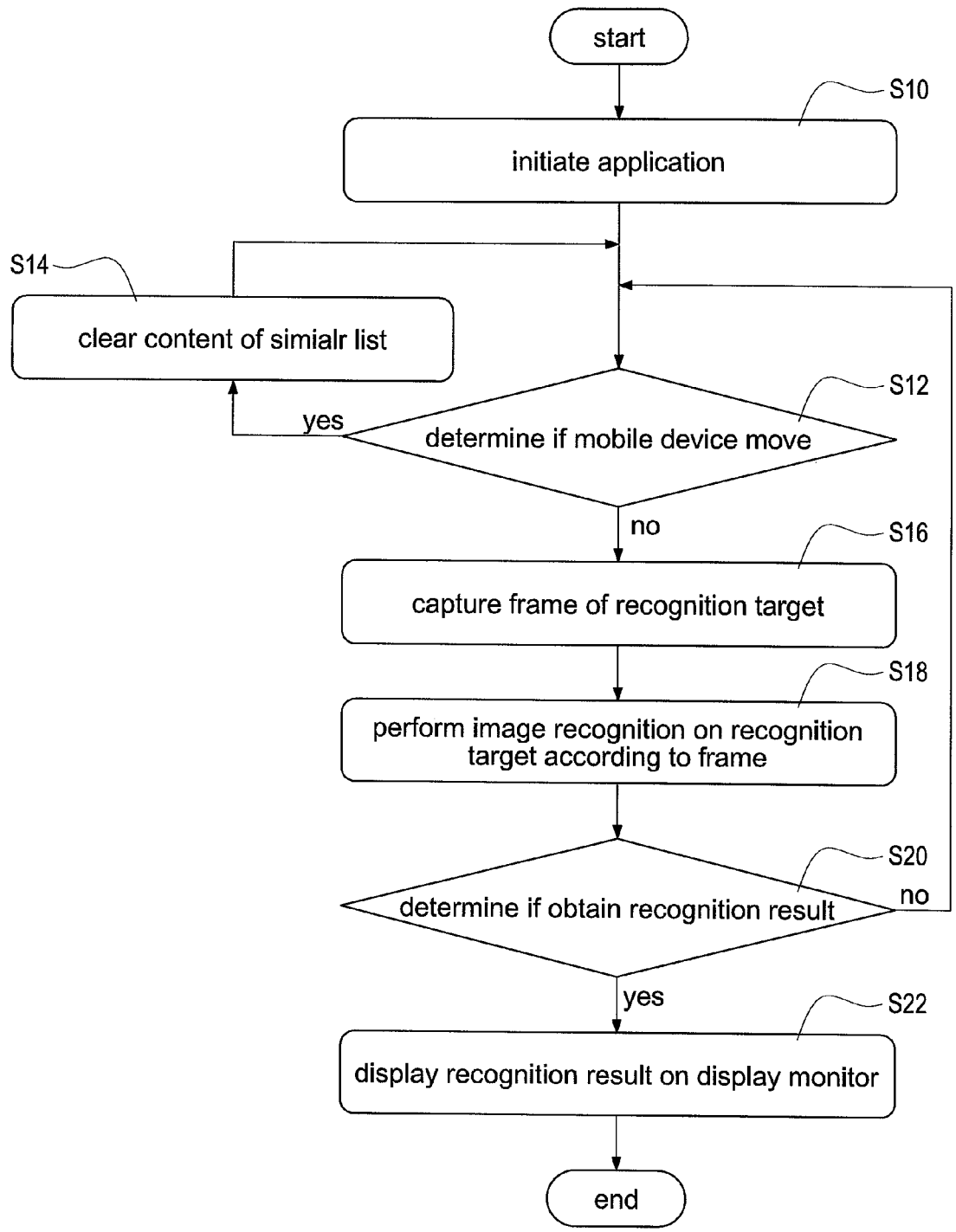
FIG. 4 is a recognition flowchart of the first preferred embodiment according to the present invention.

FIG. 4 is a recognition flowchart of the first preferred embodiment according to the present invention. First, the mobile device 2 has to capture a frame 3 of the recognition target 1 via the image capturing unit 22. In details, the mobile device 1 has to be operated by the user to initiate the application 241 (step S10). Thus, the application 241 controls the image capturing unit 22 to enter into a camera capturing model. Next, the image capturing unit 22 continues to scan the external image (the image may include the recognition target 1), and the image generated from the analysis of the application 241 for determining if the mobile device 2 moves (step S12). It should be noted that the movement mentioned here refers to instantaneous movement or long distance movement instead of swing movement.

In step S12, if it is determined the mobile device 2 moves, the image capturing unit 22 does not capture the frame 3. Further, if the movement amount of the mobile device 2 exceeds predetermined threshold value, the mobile device 2 may selectively clear the content of an similar list 244 in the storage unit 24 (step S14), the related technical characteristics of the similar list 244 are descried in the following.

In the step S12, if it is determined the mobile device 2 does not move, i.e. in a stationary status, it means that the user focuses on a specific recognition target 1. The mobile device 2 captures a frame 3 via the image capturing unit 22 (step S16). The content of the frame 3 has to include the recognition target 1. Otherwise, the mobile device 2 performs recognition on the recognition target 1 according to the frame 3. It should be noted that when the application 241 determines the mobile device 2 is in stationary, the application 241 automatically controls the image capturing unit 22 to capture the frame 3, the user does not need to press the button manually (not shown in the diagram), the captured frame 3 is different from a normal photo.

After step S16, the application 242 captures the frame 3, and performs image recognition operation on the recognition target 1 according to the frame 3 (step S18). As mentioned above, the content of the frame 3 has to include the recognition target 1 (for example the book shown in FIG. 2). If the content of the frame 3 include vague objects such as sky, floor or walls etc., the recognition of the application 241 fails.

After step S18, the application 241 determines if obtain one or several recognition results (step S20). If any recognition result is obtained, the recognition succeeds, the application 241 displays the recognition result on the display monitor 21 of the mobile device 2 (step S22). On the other hand, if no recognition result is obtained, the recognition fails. The operation of the application 241 returns to step S12 to re-determine if the mobile device 2 moves, and captures the second frame when the mobile device 2 is in stationary, and performs the second recognition according to the second frame, and so on.

Figure 5:
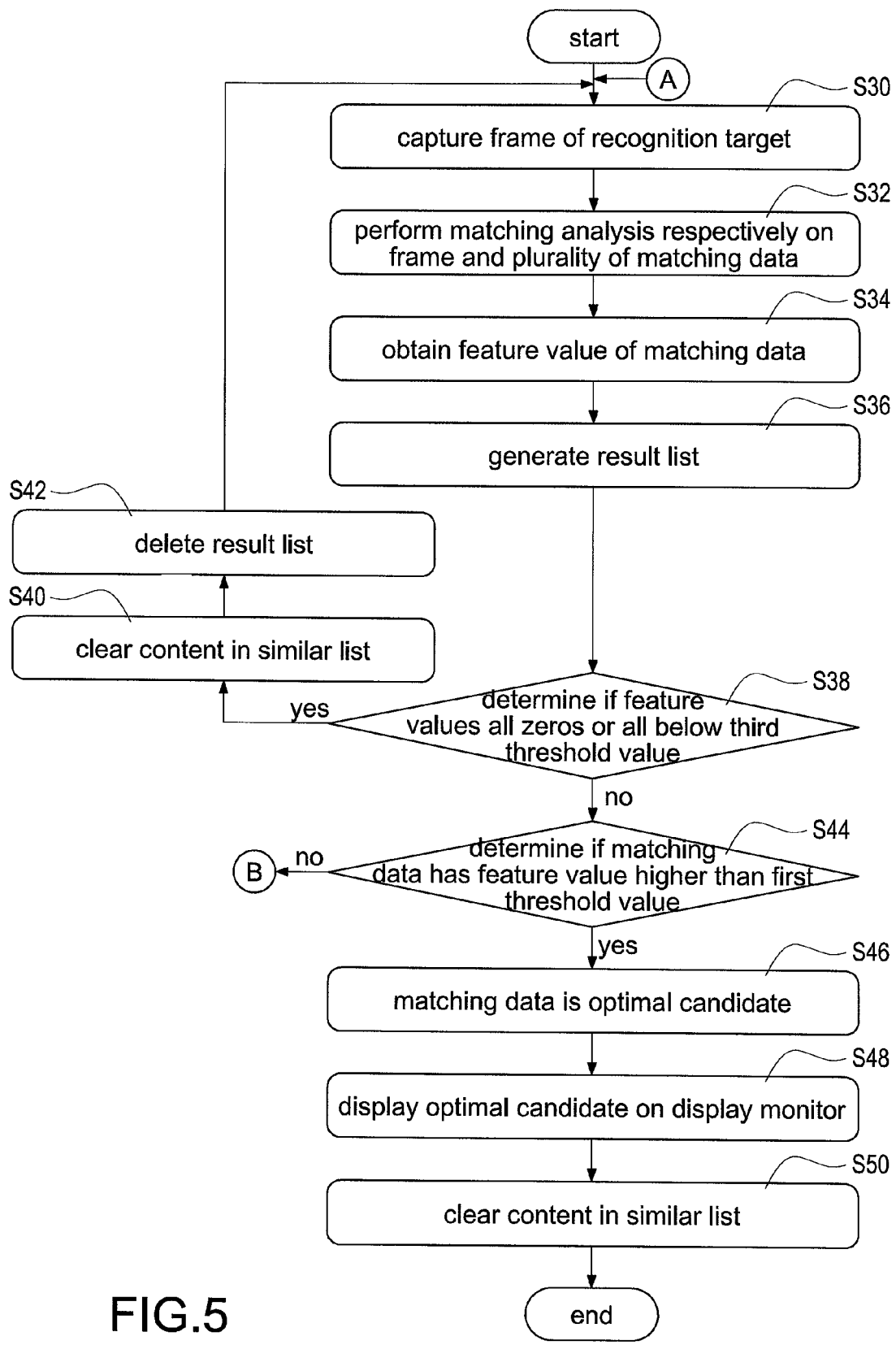
FIG. 5 is an optimal result recognition flowchart of the first preferred embodiment according to the present invention.
Figure 6:
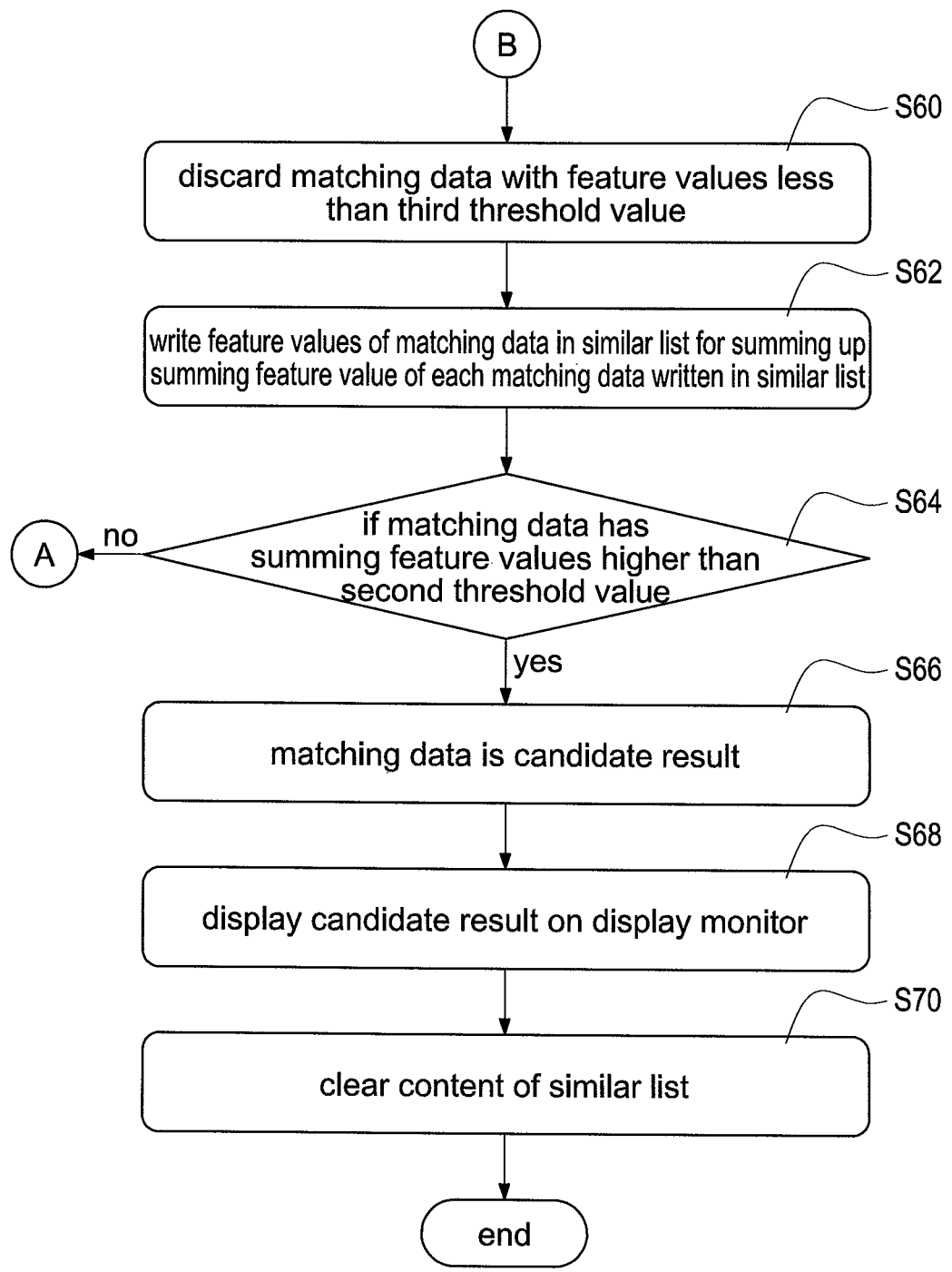
FIG. 6 is a candidate result recognition flowchart of the first preferred embodiment according to the present invention.

FIG. 5 and FIG. 6 are respectively recognition flowcharts of an optimal result and a candidate result of the first preferred embodiment according to the present invention. The steps in FIG. 5 and FIG. 6 are executed by the application 241. First, the application 241 captures the frame 3 of the recognition target 1 via the image capturing unit 22 (step S30). Next, perform a matching analysis respectively on the frame 3 and the plurality of the matching data 242 (step S32). Further, obtain feature value from matching each matching data 242 and the frame 3 according to the analysis result (step S34).

In step S32 and step S34, the application 241 performs image analysis on the frame 3 and each matching data 242 for respectively acquires one or several featuring points identical or similar between each matching data 242 and the frame 3, and determines if each matching data 242 match the frame 3 (i.e. the recognition target 1) according to the quantity of the identical or similar features points. The feature value means the quantity of the similar feature points between each matching data 242 and the frame 3. In other words, the matching data 242 having higher feature value is more similar to the frame 3 (i.e. the recognition target 1).

In the recognition method, the application 241 determines if a feature value of the matching data 242 higher than a first threshold value in the plurality of the matching data 242. If the feature value of the matching data 242 is higher than the first threshold value, the recognition succeeds. In other words, the application 241 considers the first threshold value as the condition for matching the frame 3. When the feature value of the matching data 242 is higher than the first threshold value, the matching data 242 is considered a recognition result matching with the frame 3 (i.e. the recognition target 1). Consequently, the one or several matching data 242 are considered an optimal result, and displayed on the display monitor 21 of the mobile device 2.

In details, after step S34, the application 241 acquires the feature values of all matching data 242, and selectively generates a result list 243 according to the feature values (step S36). In the embodiment, in order to invalid recognitions performed by the user (i.e. the content of the frame 3 does not include any recognition target), the application 241 determines if the feature values of the result list 243 are all zeros or all below a third threshold value (step S38). The third threshold value is less than the first threshold value, the first threshold value for example is "30", and the third threshold value for example is "3".

If the feature values of the result list 243 are all zeros or all below a third threshold value, the application 241 clears the content in the similar list 244 (details in the following) (step S40). Further, the application 241 selectively deletes the result list (step S42). Nonetheless, in another embodiment, the application 241 re-execute the above step S30 to step S38, and clears the content of the similar list 244 and deletes the result list 243 when determines that the feature values of the result list 243 are all zeros or all below a third threshold value for the second time, the third time or the nth time. Nonetheless, the above mentioned is a preferred embodiment of the present invention, the application 241 may also selectively not determine if the feature values of the result list 243 are all zeros or less than the third threshold values, and are not limited thereto.

In step S38, if the feature value are not all zeros, or not all less than the third threshold value in the result list 243, the application 241 further determines if a feature value of the matching data is higher than the first threshold value in the plurality of the matching data 242, (step S44). If the feature value of the matching data is higher than the first threshold value, the matching data 242 is considered as an optimal result matching the recognition target 1 (step S46). The optimal result is displayed in the display monitor 21 (step S48). Lastly, the application 241 clears the content in the similar list 244 (step S50).

For example, the content of the result list 243 is as shown below:

| Matching Data | Feature Value | First Threshold Value |
|---|---|---|
| A | 2 | 30 |
| B | 20 | 30 |
| C | 35 | 30 |

Result List

As the example shown in the list above, provided the feature value of a matching data A is "2" (i.e. the frame 3 has 2 similar feature point), the feature value of a matching data B is "20" (i.e. the frame 3 has 20 similar feature points), the feature value of a matching data C is "35" (i.e. the frame 3 has 35 similar feature points), and the first threshold value is sets as "30". Under the circumstance, the matching data C is considered an optimal result matching the recognition target 1, and the matching data C is displayed on the display monitor 21.

As shown in FIG. 6, in step S44, if the application 241 determines that no the feature value of the matching data 242 is higher than the first threshold value, the recognition of the frame 3 fails to generate an optimal result. Consequently, according to the present invention, the application 241 continues to sum up the feature values of each matching data 242, and in the end obtains a candidate result via the recognition for the second, the third and the nth time on the second, the third and the nth frame.

As shown in FIG. 6, the application 241 screens the matching data 242, and discards the matching data 242 having the feature values less than the third threshold value (step S60), i.e. sums up the feature values of the matching data 242 which is highly dissimilar with the recognition target 1. For example, if the third threshold value is set as "5", in the above embodiment, the feature value of the matching data A is not summed up.

Next, the application 241 reserves the matching data 242 having the feature values higher than the third threshold value, and writes the feature values of the matching data 242 in the similar list 244 for summing up a summing feature value of each matching data 242 written in the similar list 244 (step S62). Further in details, the application 241 only sums up the feature values higher than the third threshold value to the corresponding columns in the similar list 244, the feature values less than the third threshold value are not summed up.

Next, the application 241 determined if the summing feature values of the matching data are higher than the second threshold value according to the content of the similar list 244 (step S64). If the summing feature value of the matching data is higher than the second threshold value, the operation flow of the application 241 returns to the step S30 for capturing next frame 3, and performs the next image recognition operation on the next frame 3. If the recognition on the next frame 3 generates an optimal result, the optimal result is provided for user's searching reference. On the other hand, if the recognition on the next frame 3 still fails to generate an optimal result, the application 241 respectively sums up the feature values of each matching data 242 and the feature value generated from matching with the next frame 3, and updates the summing feature values of the similar list 244. In the embodiment, the second threshold value is higher than the first threshold value and the third threshold value, but is not limited thereto. Lastly, when the application 241 determines a summing feature value of the matching data 242 is higher than the second threshold value, and considers the matching data 242 as a candidate result (step S66), and displays the candidate result on the display monitor 21 (step S68).

It should be noted that, before summing up the feature value, the application 241 preliminarily screens the third threshold value. For example, if the user does not focus an obvious recognition target which results in that the feature value generated from the matching between each matching data 242 and captured frame is less than the third threshold value (i.e. the feature value is not summed up). Under the circumstance, given the application 241 captured a hundred frames, and matching a hundred times, the summing feature value of each matching data 242 does not exceed the second threshold value. That means the user does not obtain a candidate result which is totally dissimilar with the recognition target 1.

After the step S68, the application 241 clears the content of the similar list 244 (step S70). That is clearing the summing feature values written in the similar list S244. Additionally, when the candidate result is displayed, the application 241 may selectively delete the result list 243. If the recognition obtains several the optimal results or the candidate results, the application 241 sorts the feature values numerically, and displays based on the sorting order on the display monitor 21 for user's searching reference.

In order to elaborate the recognition method, an embodiment is used in the following. In the embodiment, the first threshold value is set as "20", the second threshold value is set as "35", and the third threshold value is set as "3". When the application 241 captures the first frame, and performs recognition on the first frame, the following first result list is generated according to the recognition result:

| Matching Data | Feature Value | First Threshold Value |
| --- | --- | --- |
| A | 2 | 20 |
| B | 12 | 20 |
| C | 15 | 20 |

First Result List

As the first result list described, the application 241 performs recognition on the first frame and does not obtain an optimal result, and sums up the feature value of each matching data to the similar list 244. Because the feature value of the matching data A is less than the third threshold value, and is not summed up, and the content of the similar list 244 is listed as the following:

| Matching Data | Summing Feature Value | Second Threshold Value |
| --- | --- | --- |
| A | 0 | 35 |
| B | 12 | 35 |
| C | 15 | 35 |

Similar List

As described in the similar list 244, because no summing feature value of the matching data is higher than the second threshold value, the application 241 does not obtain a candidate result. Next, the application 241 obtains the second frame, and performs recognition on the second frame, and generates the following second list according to the recognition result:

| Matching Data | Feature Value | First Threshold Value |
| --- | --- | --- |
| A | 10 | 20 |
| B | 12 | 20 |
| C | 17 | 20 |

Second Result List

As described in the second result list, the application 241 performs recognition on the second frame and does not obtain optimal result, and sums up the feature value of each matching data to the similar list 244, and the content of the similar list 244 is listed as the following:

| Matching Data | Summing Feature Value | Second Threshold Value |
| --- | --- | --- |
| A | 10(0 + 10) | 35 |
| B | 24(12 + 12) | 35 |
| C | 32(15 + 17) | 35 |

Similar List

As described in the similar list 244, after the summing up operation, no summing feature value of the matching data is higher than the second threshold value. The application 241 still does not obtain a candidate result. Next, the application 241 obtains a third frame, and performs the recognition on the third frame, and generates the following third result list according to the recognition result:

| Matching Data | Feature Value | First Threshold Value |
| --- | --- | --- |
| A | 5 | 20 |
| B | 13 | 20 |
| C | 15 | 20 |

Third Result List

As described in the third result list, the application 241 performs recognition on the third frame and does not obtain optimal result, and sums up the feature value of each matching data to the similar list 244, and the content of the similar list 244 is listed as the following:

| Matching Data | Summing Feature Value | Second Threshold Value |
| --- | --- | --- |
| A | 15(0 + 10 + 5) | 35 |
| B | 37(12 + 12 + 13) | 35 |
| C | 47(15 + 17 + 15) | 35 |

Similar List

As described in the similar list 244, after the summing up operation, the summing feature values of the matching data B and matching data C are higher than the second threshold value. The application 241 considers the matching data B and the matching data C as candidate results, and displays in the display monitor 21. In the embodiment, the summing feature value of the matching data C is higher than the summing feature value of the matching data B, the application 21 may only display the matching data C, or display the matching data C and the matching data B by the numerical order of the summing feature value.

In the recognition method, after the recognition of each frame, the application 241 first determines if optimal result is generated, if no optimal result, then the feature value is summed up to the similar list 244. In other words, the application 241 generates the result list 243 for each frame, and, the application 241 deletes the result list 243 when displays an optimal result, a candidate result, or the feature values of the result list 243 are all zeros or less than the third threshold value. Additionally, when perform recognition on the next frame, the application 241 generates a new result list 243 for the next frame.

Different from the result list 243, the similar list 244 is the result of summing up the feature values, and the similar list 244 remains to exist and is not deleted. Additionally, after an optimal result is displayed, a candidate result is displayed, the mobile device 2 moves and the moving amount exceeding a predetermined threshold value, or the feature values of the result list 243 are all zeros or less than the third threshold value, the application 241 clears the content of the similar list 244, which means, clears the summing feature values written in the similar list 244.

With the recognition method of the present invention, when the recognition of a frame 3 succeeds, the mobile device 2 provides an optimal result for user's searching reference. When the recognition of a frame 3 fails, the mobile device 2 continues to perform recognition on the second frame, the third frame to the nth frame, and uses the mechanism of the summing feature value for obtaining a candidate result in the end for user's searching reference. In other words, given that the capturing angles and lighting of single one frame 3 are not ideal for performing recognition, the recognition based on the method of the present invention does not fail if any matching data 242 identical with the recognition target.

As the skilled person will appreciate, various changes and modifications can be made to the described embodiments. It is intended to include all such variations, modifications and equivalents which fall within the scope of the invention, as defined in the accompanying claims.

What is claimed is:

1. A cumulative image recognition method for a mobile device, wherein a plurality of the matching data is saved in the mobile device, the cumulative image recognition method comprising:
    a) capturing frames of a recognition target via an image capturing unit of a mobile device;
    b) performing with the mobile device matching analysis on the frame and the plurality of the matching data;
    c) respectively obtaining with the mobile device feature values of each matching data according to the analysis result;
    d) determining with the mobile device if the feature value of the matching data is higher than a first threshold value;
    e) the matching data being an optimal result if the matching data has the feature value higher than the first threshold value, and displaying the optimal result on a display monitor of the mobile device;
    f) if the feature value of the matching data is not higher than the first threshold value, writing with the mobile device the feature value of each matching data in an similar list for summing up the summing feature value of each matching data written in the similar list;
    g) determining with the mobile device if the summing feature value of the matching data is higher than a second threshold value;
    h) if the summing feature value of the matching data is not higher than the second threshold value, re-executing step a to step g; and
    i) the matching data being a candidate result if the matching data has the summing feature value higher than the second threshold value, and displaying the candidate result on the display monitor of the mobile device.

2. The cumulative image recognition method of claim 1, wherein the mobile device executes an image analysis via an application program stored on a non-transitory computer readable medium in the mobile device, for respectively acquiring one or several featuring points identical between each matching data and the frame, the feature value is the quantity of the one or several featuring points.

3. The cumulative image recognition method of claim 2, wherein the second threshold value is higher than the first threshold value.

4. The cumulative image recognition method of claim 2, wherein the step a comprising following steps:
    a1) initiating the application program controlling the image capturing unit to enter into a camera capturing model;
    a2) the image capturing unit scanning the external image for determining if the mobile device moves via scanning the external image the image capturing unit;
    a3) if the mobile device does not move, the image capturing unit capturing the frame.

5. The cumulative image recognition method of claim 4, wherein the method further comprises a step a4: following step a3, if the mobile device moves, and the move value exceeds a predetermined threshold value, clearing the summing feature values written in the similar list.

6. The cumulative image recognition method of claim 2, wherein further comprises a step j: after step e and step h, clearing the summing feature values written in the similar list.

7. The cumulative image recognition method of claim 2, wherein further comprising following steps:
    k) following step c, establishing a result list according to the feature value of each matching data;
    l) determining if the feature values in the result list are all zero or all less than a third threshold value;
    m) if the feature values in the result list are all zero or all less than a third threshold value, clearing the summing feature values written in the similar list; and
    n) if the feature values in the result list are not all zero or all less than a third threshold value, continuing to execute step d.

8. The cumulative image recognition method of claim 7, wherein the step m comprising following steps:
    m1) if the feature values in the result list are all zero or all less than a third threshold value, re-executing step a, b, c, k and l;
    m2) following step m1, if the feature values in the result list still are all zero or all less than a third threshold value, clearing the summing feature values written in the similar list.

9. The cumulative image recognition method of claim 7, wherein further comprises a step o: after step e, h, m, deleting the result list.

10. The cumulative image recognition method of claim 2, wherein in step f, the mobile device only sums up the feature value high than a third threshold value with the similar list, wherein the third threshold value is less than the first threshold value and the second threshold value.

* * * * *